US012627406B2

(12) United States Patent
Ibrahim et al.

(10) Patent No.: US 12,627,406 B2
(45) Date of Patent: May 12, 2026

(54) QUICK RECOVERY INDICATION AND RETRANSMISSION REQUEST

(71) Applicant: Samsung Electronics Co., Ltd., Suwon-si (KR)

(72) Inventors: Ahmed Atef Ibrahim Ibrahim, Plano, TX (US); Boon Loong Ng, Plano, TX (US); Vishnu Vardhan Ratnam, Plano, TX (US); Rubayet Shafin, Allen, TX (US); Junsu Choi, Siheung-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 539 days.

(21) Appl. No.: 18/148,946

(22) Filed: Dec. 30, 2022

(65) Prior Publication Data

US 2023/0231656 A1 Jul. 20, 2023

Related U.S. Application Data

(60) Provisional application No. 63/304,376, filed on Jan. 28, 2022, provisional application No. 63/300,942, filed on Jan. 19, 2022.

(51) Int. Cl.
*H04L 1/00* (2006.01)
*H04L 1/1607* (2023.01)
(Continued)

(52) U.S. Cl.
CPC .............. *H04L 1/1614* (2013.01); *H04L 1/18* (2013.01); *H04W 74/0808* (2013.01); *H04W 84/12* (2013.01)

(58) Field of Classification Search
None
See application file for complete search history.

(56) References Cited

U.S. PATENT DOCUMENTS

| 12,267,766 B2 * | 4/2025 | Kneckt ............... H04W 12/037 |
| 2017/0063562 A1 | 3/2017 | Cariou et al. |

(Continued)

FOREIGN PATENT DOCUMENTS

| WO | WO-2019021588 A1 * | 1/2019 | .......... H04L 1/0047 |
| WO | 2021010664 A1 | 1/2021 | |
| WO | 2021089033 A1 | 5/2021 | |

OTHER PUBLICATIONS

Extended European Search Report issued Aug. 2, 2024 regarding Application No. 23743389.1, 8 pages.
(Continued)

*Primary Examiner* — Gerald A Smarth

(57) ABSTRACT

Methods and apparatuses for facilitating, in multi-link devices (MLDs) that are capable of exchanging an Aggregated MAC Protocol Data Unit (A-MPDU), simultaneous transmission of the A-MPDU and retransmission of failed MPDUs of the A-MPDU. A non-access point (AP) MLD comprises STAs, each comprising a transceiver configured to form a link with a corresponding AP of an AP MLD, and a processor. A first transceiver is configured to receive, from the AP MLD on a first of the links, an A-MPDU comprised of multiple MPDUs. the processor is configured to detect, during reception of the A-MPDU, that at least one of the MPDUs has not been received. A second transceiver is configured to transmit, to the AP MLD on a second of the links, a request to retransmit the at least one MPDU on the second link before reception of the A-MPDU on the first link is complete.

20 Claims, 12 Drawing Sheets

(51) Int. Cl.
  *H04L 1/18*          (2023.01)
  *H04W 74/0808*    (2024.01)
  *H04W 84/12*        (2009.01)

(56)                    References Cited

U.S. PATENT DOCUMENTS

| | | |
|---|---|---|
| 2019/0342916 A1 | 11/2019 | Liu et al. |
| 2020/0244402 A1 | 7/2020 | Son et al. |
| 2021/0083805 A1 | 3/2021 | Kneckt et al. |
| 2021/0195578 A1 | 6/2021 | Huang et al. |
| 2021/0211235 A1 | 7/2021 | Chu et al. |
| 2022/0167256 A1* | 5/2022 | Kneckt ............... H04W 12/106 |
| 2022/0263604 A1 | 8/2022 | Li et al. |
| 2022/0322473 A1 | 10/2022 | Hwang et al. |

OTHER PUBLICATIONS

IEEE P802.11be-D2.1 "Part 11: Wireless LAN Medium Access Control (MAC) and Physical Layer (PHY) Specifications, Amendment 8: Enhancements for extremely high throughput (EHT)" Jul. 2022, 885 pages.
International Search Report and Written Opinion issued Apr. 10, 2023 regarding International Application No. PCT/KR2023/ 000194, 8 pages.
Chu et al., "A-MPDU and BA", doc.: IEEE 802.11-19/1856r3, Jan. 2020, 15 pages.

* cited by examiner

302

QoS Data Link

Recovery Link

602

Octets:        1          1              1                2              8          variable      variable Bits:          1          1              1                1              1            1             2            8

| Frame ID (1 octet) | QRL ID (1 octet) | Activation/Termination (1 bit) |
|---|---|---|

| Frame ID (1 octet) | QRL ID (1 octet) | Activation/Termination (1 bit) | Intended TID/AC (1 octet) |
|---|---|---|---|

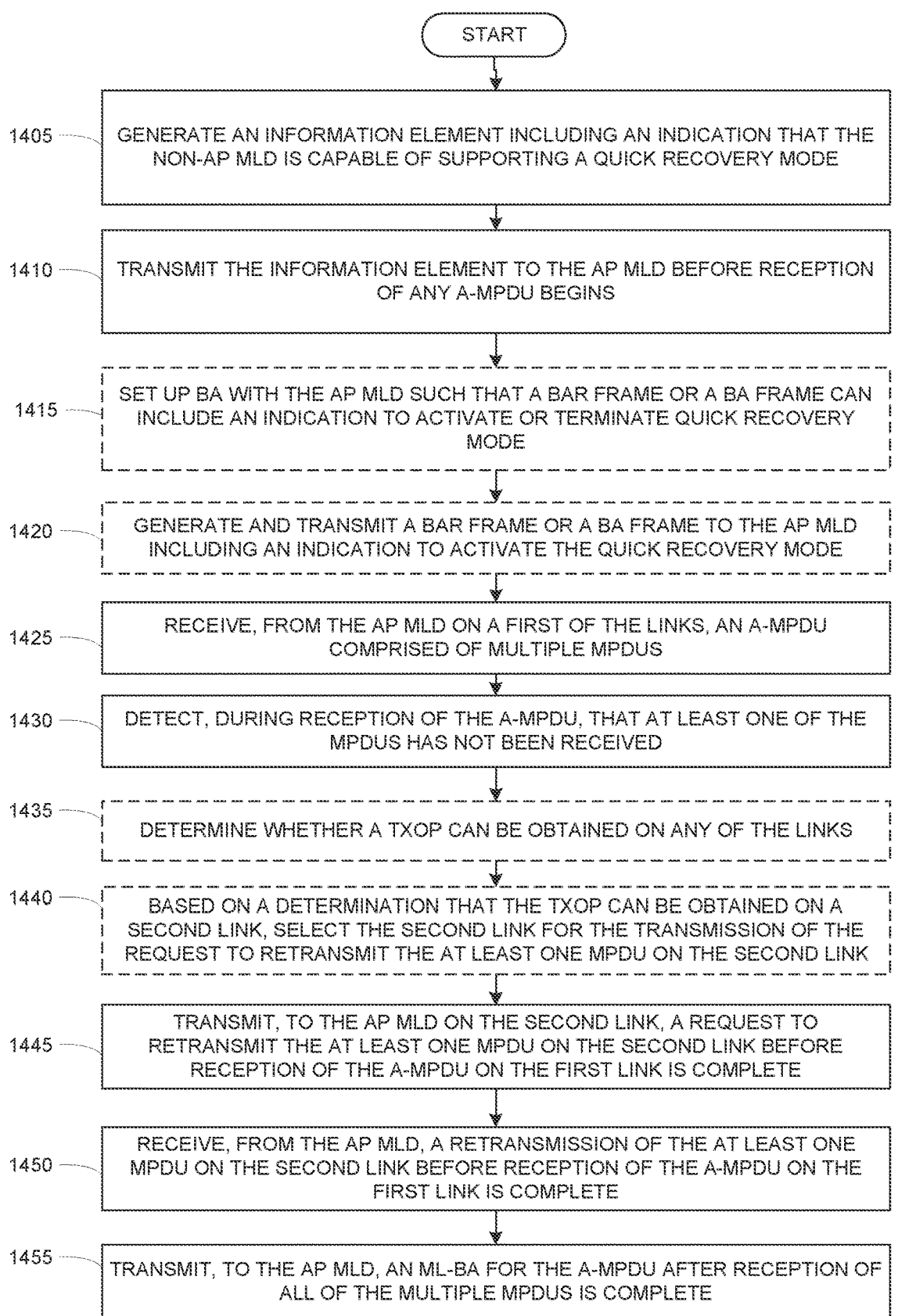

START

1405 — GENERATE AN INFORMATION ELEMENT INCLUDING AN INDICATION THAT THE NON-AP MLD IS CAPABLE OF SUPPORTING A QUICK RECOVERY MODE

1410 — TRANSMIT THE INFORMATION ELEMENT TO THE AP MLD BEFORE RECEPTION OF ANY A-MPDU BEGINS

1415 — SET UP BA WITH THE AP MLD SUCH THAT A BAR FRAME OR A BA FRAME CAN INCLUDE AN INDICATION TO ACTIVATE OR TERMINATE QUICK RECOVERY MODE

1420 — GENERATE AND TRANSMIT A BAR FRAME OR A BA FRAME TO THE AP MLD INCLUDING AN INDICATION TO ACTIVATE THE QUICK RECOVERY MODE

1425 — RECEIVE, FROM THE AP MLD ON A FIRST OF THE LINKS, AN A-MPDU COMPRISED OF MULTIPLE MPDUS

1430 — DETECT, DURING RECEPTION OF THE A-MPDU, THAT AT LEAST ONE OF THE MPDUS HAS NOT BEEN RECEIVED

1435 — DETERMINE WHETHER A TXOP CAN BE OBTAINED ON ANY OF THE LINKS

1440 — BASED ON A DETERMINATION THAT THE TXOP CAN BE OBTAINED ON A SECOND LINK, SELECT THE SECOND LINK FOR THE TRANSMISSION OF THE REQUEST TO RETRANSMIT THE AT LEAST ONE MPDU ON THE SECOND LINK

1445 — TRANSMIT, TO THE AP MLD ON THE SECOND LINK, A REQUEST TO RETRANSMIT THE AT LEAST ONE MPDU ON THE SECOND LINK BEFORE RECEPTION OF THE A-MPDU ON THE FIRST LINK IS COMPLETE

1450 — RECEIVE, FROM THE AP MLD, A RETRANSMISSION OF THE AT LEAST ONE MPDU ON THE SECOND LINK BEFORE RECEPTION OF THE A-MPDU ON THE FIRST LINK IS COMPLETE

1455 — TRANSMIT, TO THE AP MLD, AN ML-BA FOR THE A-MPDU AFTER RECEPTION OF ALL OF THE MULTIPLE MPDUS IS COMPLETE

FIG. 14

QUICK RECOVERY INDICATION AND RETRANSMISSION REQUEST

CROSS-REFERENCE TO RELATED APPLICATION AND CLAIM OF PRIORITY

This application claims priority under 35 U.S.C. § 119 (e) to U.S. Provisional Patent Application No. 63/300,942 filed on Jan. 19, 2022, and U.S. Provisional Patent Application No. 63/304,376 filed on Jan. 28, 2022, which are hereby incorporated by reference in their entirety.

TECHNICAL FIELD

This disclosure relates generally to transmission efficiency in wireless communications systems that include multi-link devices. Embodiments of this disclosure relate to methods and apparatuses that enable, in multi-link devices that are capable of exchanging an Aggregated MAC Protocol Data Unit (A-MPDU) in a wireless local area network communications system, simultaneous transmission of the A-MPDU and retransmission of failed MPDUs of the A-MPDU.

BACKGROUND

Wireless local area network (WLAN) technology allows devices to access the internet in the 2.4 GHz, 5 GHZ, 6 GHZ, or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Block Acknowledgment (BA) is one of the major features that enable aggregation of multiple MAC Protocol Data Units (MPDUs) using one Aggregated MAC Protocol Data Unit (A-MPDU). With BA capability, multiple MPDUs in one A-MPDU can be acknowledged together in a single BA. The IEEE 802.11 baseline standard defines a protected BA mechanism whereby scoreboard context can only be updated using a robust Add Block ACK (ADDBA) Request frame that updates $WinStart_B$ and $WinSize_B$, where a Block ACK Request (BAR) frame is only used to indicate reception status. The recipient advances the windows after validation and responds with a robust ADDBA Response frame. After the handshake is complete, the originator updates its windows ($WinStart_O$ and $WinSize_O$) accordingly. The reason is that ADDBA Request and ADDBA Response frames are management frames that can be protected, while control frames such as the BAR frame cannot be protected. Hence, BAR is not robust against attacks that may interfere with the reorder buffer by changing buffer windows.

Next generation extremely high throughput (EHT) WI-FI systems, e.g., IEEE 802.11be, support multiple bands of operation, called links, over which an access point (AP) and a non-AP device can communicate with each other. Thus, both the AP and non-AP device may be capable of communicating on different bands/links, which is referred to as multi-link operation (MLO). The WI-FI devices that support MLO are referred to as multi-link devices (MLDs). With MLO, it is possible for a non-access point (non-AP) MLD to discover, authenticate, associate, and set up multiple links with an AP MLD. Channel access and frame exchange is possible on each link that is set up between the AP MLD and non-AP MLD.

Multi-link Block Acknowledgement (ML-BA) is another key feature that is introduced for EHT WI-FI systems, whereby a BA can be sent on any enabled link between MLDs as long as the same traffic identifier (TID) is mapped to the link that carries the BA and the link that carries the related data, e.g., Quality of Service (QoS) data.

SUMMARY

Embodiments of the present disclosure provide methods and apparatuses that facilitate, in MLDs that are capable of exchanging an A-MPDU in a WLAN, simultaneous transmission of the A-MPDU and retransmission of failed MPDUs of the A-MPDU.

In one embodiment, a non-AP MLD is provided, comprising STAs and a processor operably coupled to the STAs. The STAs each comprise a transceiver configured to form a link with a corresponding AP of an AP MLD. A first of the transceivers is further configured to receive, from the AP MLD on a first of the links, an A-MPDU comprised of multiple MPDUs. the processor is configured to detect, during reception of the A-MPDU, that at least one of the MPDUs has not been received. A second of the transceivers is further configured to transmit, to the AP MLD on a second of the links, a request to retransmit the at least one MPDU on the second link before reception of the A-MPDU on the first link is complete.

In another embodiment, an AP MLD is provided, comprising APs and a processor operably coupled to the APs. The APs each comprise a transceiver configured to form a link with a corresponding STA of a non-AP MLD. A first of the transceivers is further configured to transmit, to the non-AP MLD on a first of the links, an A-MPDU comprised of multiple MPDUs. A second of the transceivers is further configured to receive, from the non-AP MLD on a second of the links, a request to retransmit at least one of the MPDUs on the second link before reception of the A-MPDU by the non-AP MLD on the first link is complete. The processor is configured to determine, based on the received request to retransmit the at least one MPDU, that the at least one MPDU was not received by the non-AP MLD.

In another embodiment, a method of wireless communication is provided, performed by a non-AP MLD that comprises STAs that each comprise a transceiver configured to form a link with a corresponding AP of an AP MLD. The method includes the steps of receiving, from the AP MLD on a first of the links, an A-MPDU comprised of multiple MPDUs, detecting, during reception of the A-MPDU, that at least one of the MPDUs has not been received, and transmitting, to the AP MLD on a second of the links, a request to retransmit the at least one MPDU on the second link before reception of the A-MPDU on the first link is complete.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 14 illustrates an example of a quick recovery mode operation of MLDs that facilitates simultaneous transmission of an A-MPDU and retransmission of failed MPDUs of the A-MPDU according to various embodiments of the present disclosure.

DETAILED DESCRIPTION

Figure 1:
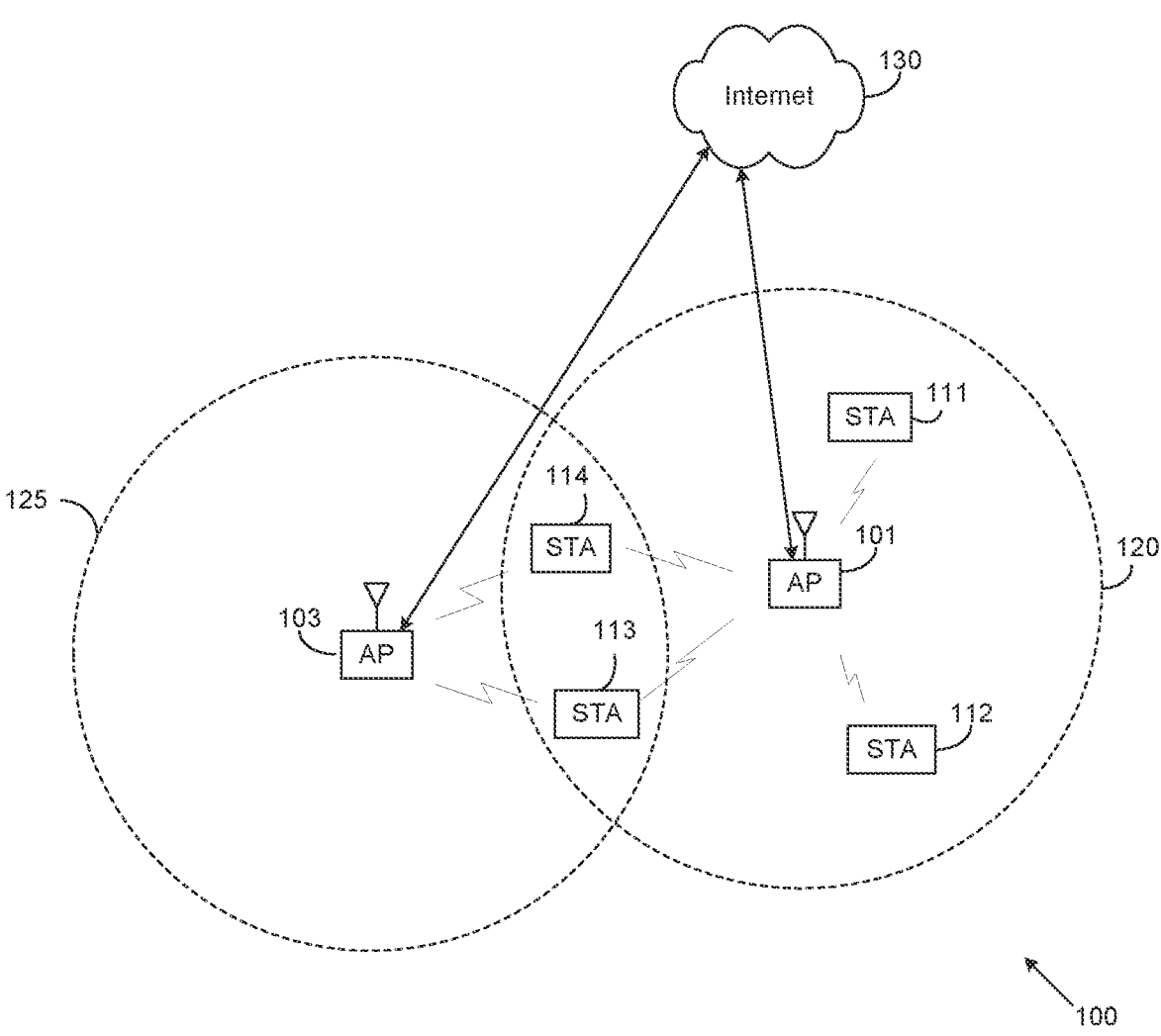
FIG. 1 illustrates an example wireless network according to various embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Multi-Link Block-Acknowledgment (ML-BA) operation was introduced to utilize MLO as follows: ML-BA uses a single common buffer for all enabled links that have the same TID mapped to them and A-MPDUs for all links are pulled from the common buffer with continuous sequence number (SN). ML-BA brings benefits over non-ML BA for large buffer data as it allows transmission of the BA on any of the enabled links, not just on the link that carries the QoS Data (i.e., the A-MPDU).

However, embodiments of the present disclosure recognize that only marginal gains over non-ML BA can be achieved if instantaneous communication between STAs is possible. This is because retransmission of failed MPDUs of the A-MPDU is allowed on any of the enabled links that have the same TIDs mapped to them, and the retransmission will not start until the ML-BA is received by the originator, which is after the A-MPDU and BAR are received by the recipient and the scoreboard is updated based on received BA at the originator. Therefore, MLO is currently not utilized efficiently to enhance retransmission compared to single-link BA operation, especially if a single link is used for QoS data transmission (where BA is discouraged due to retransmission latency) and if increased size of A-MPDU is used (for example, 512 and 1024 subframes are now possible in 802.11be).

Accordingly, embodiments of the present disclosure provide methods and apparatuses that facilitate simultaneous transmission of an A-MPDU and retransmission of failed MPDUs of the A-MPDU. For example, embodiments of the present disclosure provide a Quick Recovery (QR) mode of operation that enables a recipient MLD to transmit a notification to the originator of a failed MPDU on a second link that is different from the first link that carries the QoS data, thereby enabling the originator MLD to retransmit the failed MPDU on any of the enabled links that are different from the first link even if the QoS data A-MPDU is still being transmitted. Embodiments of the present disclosure enable the receiver to construct a QR-BA frame to notify the transmitter of a failed MPDU, and enable the transmitter to translate the received QR-BA frame. Embodiments of the present disclosure additionally provide signaling for indicating the capability of an MLD to support QR mode operation.

Embodiments of the present disclosure further recognize that reserving a second link for the purposes of retransmission will leave the second link idle most of the time, which incurs a cost that could outweigh the benefits of the QR mode. Accordingly, embodiments of the present disclosure provide methods and apparatuses that facilitate dynamic activation and termination of QR mode as needed. For example, embodiments of the present disclosure provide new frames and modified frames that can be transmitted from the originator or the recipient to indicate activation or termination of QR mode.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating, in MLDs that are capable of exchanging an A-MPDU in a WLAN, simultaneous transmission of the A-MPDU and retransmission of failed MPDUs of the A-MPDU. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
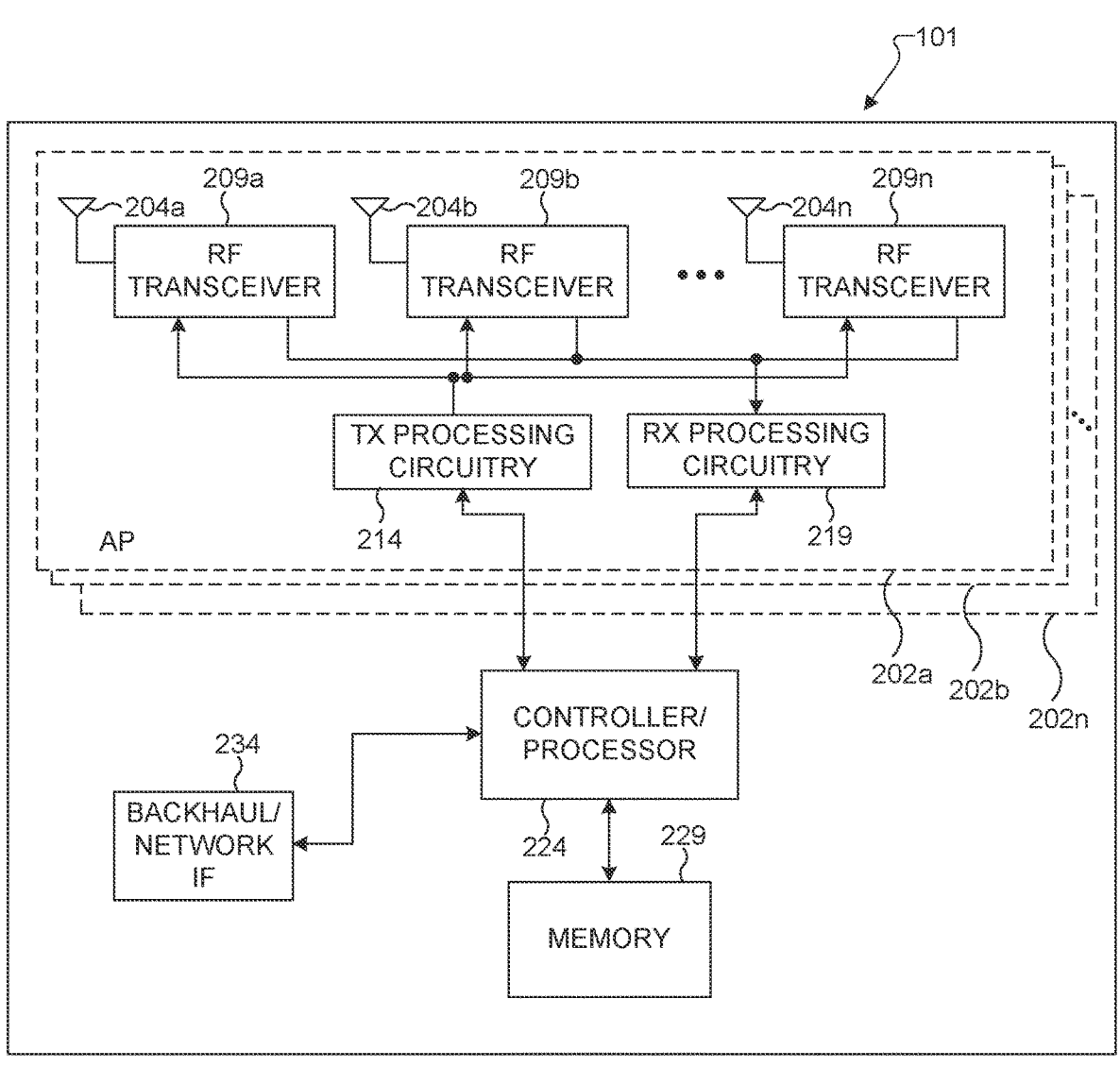
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX)

processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHz, or 6 GHZ, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHZ, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including facilitating simultaneous transmission of an A-MPDU and retransmission of failed MPDUs of the A-MPDU. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for facilitating simultaneous transmission of an A-MPDU and retransmission of failed MPDUs of the A-MPDU. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs.

Figure 2B:
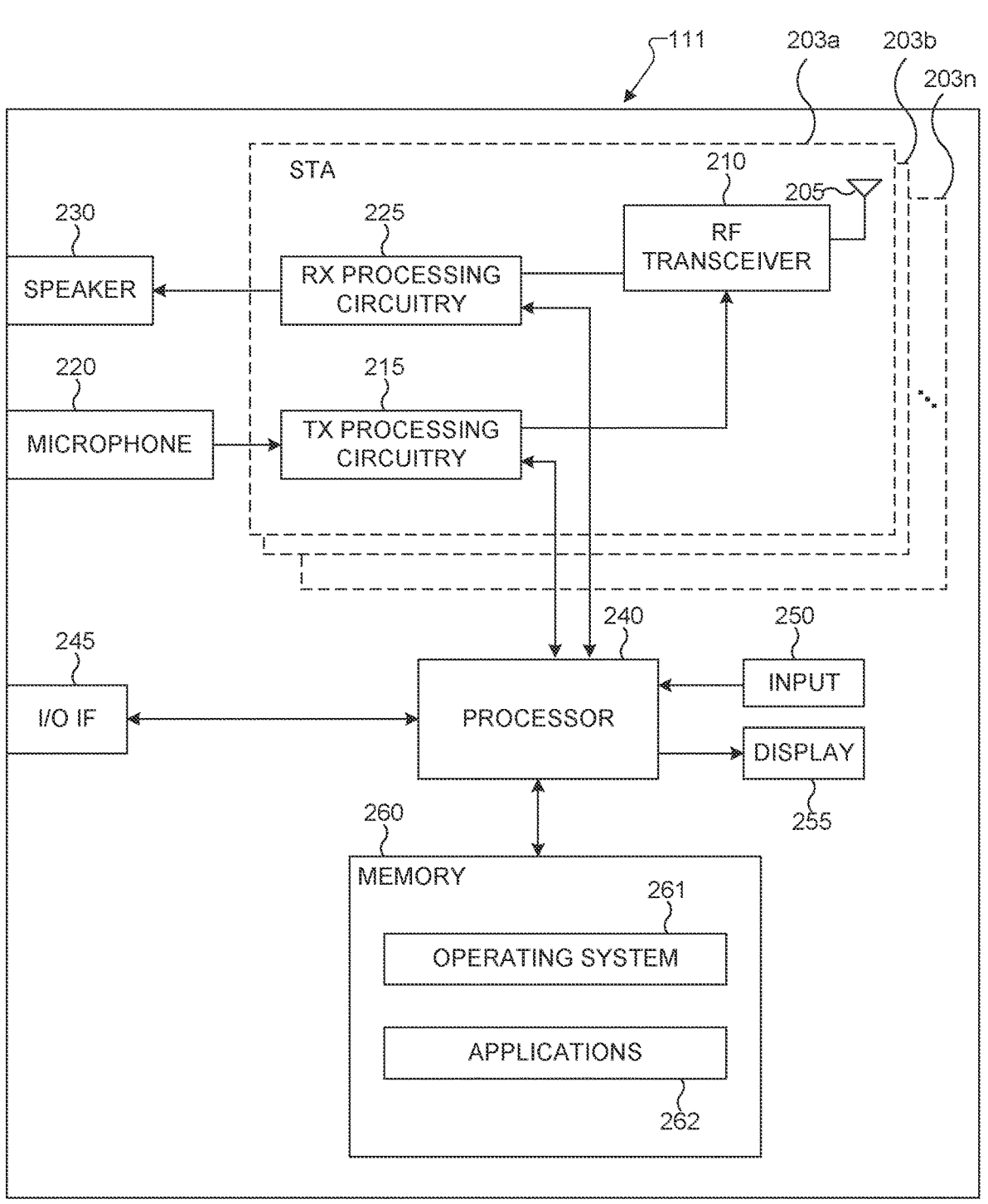
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives, from the antenna(s) 205, an incoming RF signal transmitted by an AP of the network 100. In some embodiments, each affiliated STA 203a-203n operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHZ, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to facilitate simultaneous transmission of an A-MPDU and retransmission of failed MPDUs of the A-MPDU. In some embodiments, the controller/processor 240 includes at least one microprocessor or microcontroller.

The controller/processor 240 is also capable of executing other processes and programs resident in the memory 260, such as operations for facilitating simultaneous transmission of an A-MPDU and retransmission of failed MPDUs of the A-MPDU. The controller/processor 240 can move data into or out of the memory 260 as required by an executing process. In some embodiments, the controller/processor 240 is configured to execute a plurality of applications 262, such as applications for facilitating simultaneous transmission of an A-MPDU and retransmission of failed MPDUs of the A-MPDU. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

Figure 3:
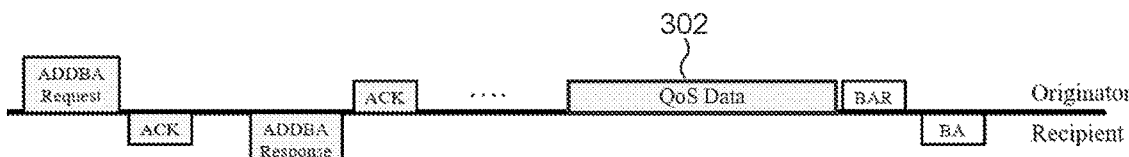
FIG. 3 illustrates an example of single-link BA agreement setup, data transfer, and acknowledgement according to embodiments of the present disclosure.

FIG. 3 illustrates an example of single-link BA agreement setup, data transfer, and acknowledgement according to embodiments of the present disclosure. In this example, the originator (or transmitter) may be an AP, and the recipient (or receiver) may be a STA.

In the example of FIG. 3, the originator sets up protected BA by sending an ADDBA Request frame, and the recipient responds with the ADDBA Response frame after validating the ADDBA Request frame and updating its windows. The originator updates its windows after receiving the ADDBA Response frame. Once the protected BA is set up, the originator can transmit QoS Data 302 in an A-MPDU. A BAR/BA exchange is then used to validate reception status.

According to embodiments of the present disclosure, a Quick Recovery (QR) mode is defined for use with ML-BA. The QR mode utilizes two or more links between two or more MLDs for a single A-MPDU—e.g., a data link (DL) that carries QoS data from originator to recipient and a quick recovery link (QRL) that carries a failed MPDU indication from recipient to originator and carries the retransmission of the one or more failed MPDUs from the originator to the recipient. Therefore, TXOPs on both links are utilized for a single A-MPDU transmission as opposed to transmitting two or more different A-MPDUs on the same links.

In the QR mode, because the receiver can transmit a notification to the originator of a failed MPDU on a second link that is different from a first link that carries QoS data, the originator can start retransmission for the failed MPDU on the second link without waiting for the A-MPDU to complete transmission on the first link. Thereby, the total time for the reception of the A-MPDU decreases.

In some embodiments, the QR mode can reserve two links, where one of the links (e.g., the DL) carries the QoS data and the other link (e.g., the QRL) is kept on hold waiting for any failed MPDU notification to retransmit. In other embodiments, the QR mode can operate in an opportunistic manner. In the opportunistic behavior, when there is a failure to receive an MPDU of a QoS data A-MPDU transmission on a QoS data link, if there is an idle link on which the MLDs can obtain a TXOP and to which the TIDs of the QoS data link are also mapped, then the idle link may be used as a QRL.

In one embodiment, a receiver shall not select as QRL a link that forms a Non-Simultaneous Transmit/Receive (NSTR) pair or Enhanced Multi-Link Single-Radio (EMLSR) pair (at either the transmitter or receiver) with at least one of the QoS data links.

Figure 4:
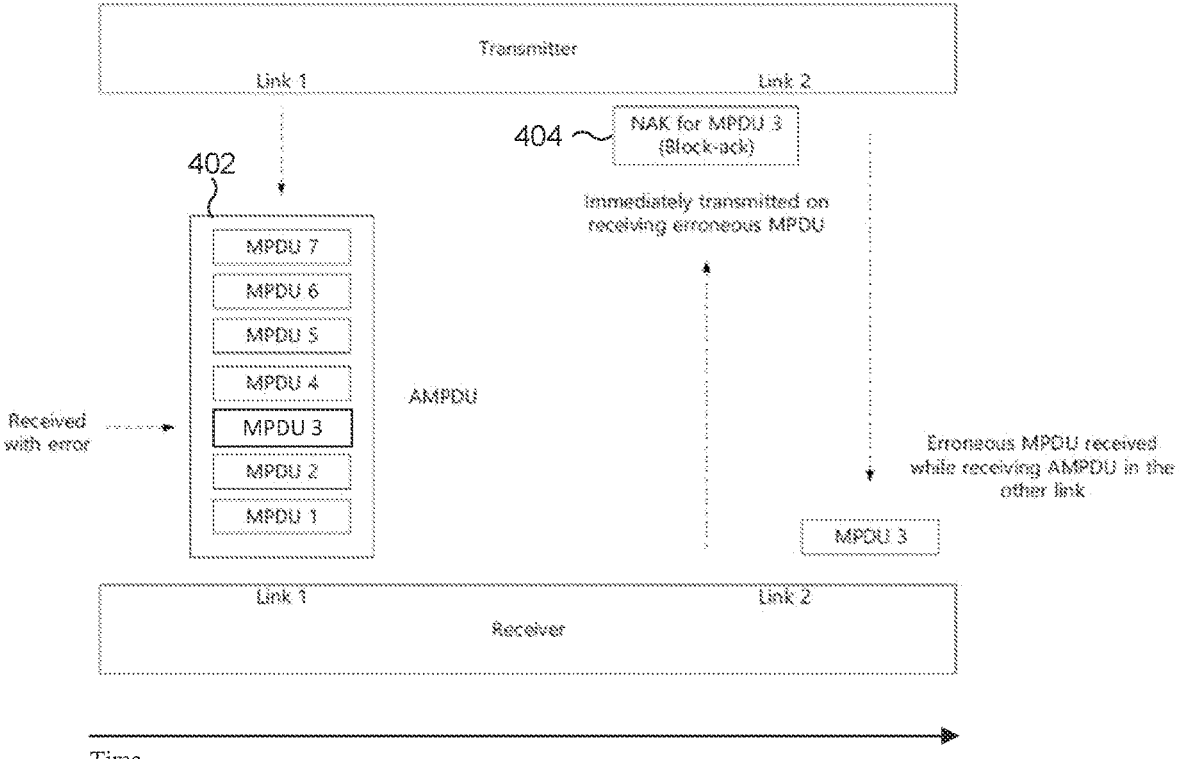
FIG. 4 illustrates an example of Quick Recovery mode operation for MLO according to embodiments of the present disclosure.

FIG. 4 illustrates an example of Quick Recovery mode operation for MLO according to embodiments of the present disclosure. In this example, the transmitter (or originator) may be an AP MLD, such as AP MLD 101, and the receiver (or recipient) may be a non-AP MLD, such as non-AP MLD 111. Furthermore, although two links (Link 1 and Link 2) are shown between the transmitter and the receiver, it is understood that this process could be applied with any number of suitable suitable MLDs having any number of affiliated APs or STAs. For ease of explanation, it is understood that references to an AP MLD and a non-AP MLD in further embodiments below refer to the AP MLD 101 and non-AP MLD 111, respectively.

In the example of FIG. 4, MPDU 3 of the A-MPDU 402 is received by the receiver on Link 1 with an error. MPDU 3 may alternatively be referred to as a failed MPDU, a failing MPDU, an MPDU that was not received or not received correctly, or in any other suitable manner. The receiver determines that MPDU 3 was not received correctly while it is still receiving the A-MPDU 402. In response to this determination, the receiver transmits a negative acknowledgement (NACK) 404 for MPDU 3 to the transmitter over Link 2, while the receiver simultaneously continues receiving the A-MPDU 402 on Link 1. The NACK 404 may be a BA frame, such as the QR-BA frame discussed further below. The transmitter, upon receiving the NACK 404, retransmits MPDU 3 on Link 2 (or any other enabled link) while it simultaneously continues transmitting the A-MPDU 402 on Link 1.

Figure 5A:
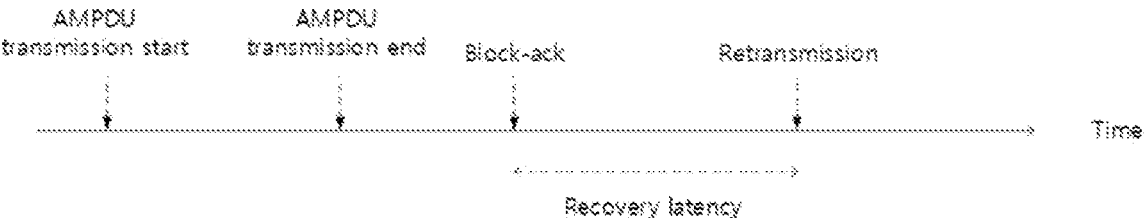
FIG. 5A illustrates an example timing for A-MPDU transmission using ML-BA without QR mode operation according to embodiments of the present disclosure.
Figure 5B:
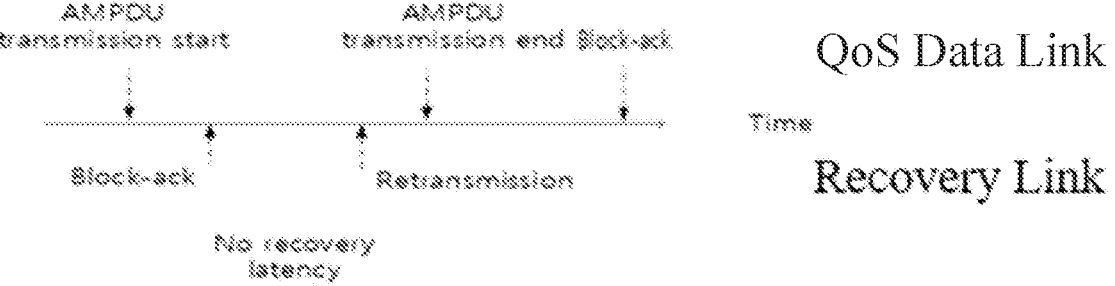
FIG. 5B illustrates an example timing for A-MPDU transmission using ML-BA with QR mode operation according to embodiments of the present disclosure.

FIGS. 5A and 5B illustrate the improvement in total transmission time of an A-MPDU that is gained using the QR methods of the present disclosure.

FIG. 5A illustrates an example timing for A-MPDU transmission using ML-BA without QR mode operation according to embodiments of the present disclosure. In this example, because the receiver must wait until the A-MPDU has finished transmitting to send a BA that includes an indication of failed MPDUs from the A-MPDU, there is recovery latency incurred between the completion of the A-MPDU transmission and the retransmission of failed MPDUs.

FIG. 5B illustrates an example timing for A-MPDU transmission using ML-BA with QR mode operation according to embodiments of the present disclosure. In this example, because the MLDs are able to utilize the QRL during transmission of the A-MPDU on the QoS data link, the receiver is able to transmit a BA (e.g., a QR-BA) on the QRL including an indication of failed MPDUs from the A-MPDU before the A-MPDU has finished transmitting on the QoS data link, and likewise the transmitter is able to retransmit the failed MPDUs on the QRL before the A-MPDU has finished transmitting on the QoS data link. As a result, there is no recovery latency incurred—the retransmission of failed MPDUs is completed before the BA for the A-MPDU is sent.

Various embodiments of the present define capability indication signaling whereby an MLD (either the transmitter or the receiver) can indicate its capability to support QR mode. The capability indication allows the transmitter and receiver to expect a BA to be sent on a link different from the QoS data link during the data reception duration (e.g., instead of receiving the BA a Short Inter-frame Spacing (SIFS) after the end of A-MPDU). This indication may be referred to as a QR indication, QR mode indication, QR capability indication, QR support indication, QR mode capability indication, QR mode support indication, or using any other suitable name.

In one embodiment, an MLD can use an EHT Capabilities element to indicate that the MLD is capable of supporting QR mode. The indication may be included in an EHT MAC Capabilities Information field of the EHT Capabilities element.

Figure 6:
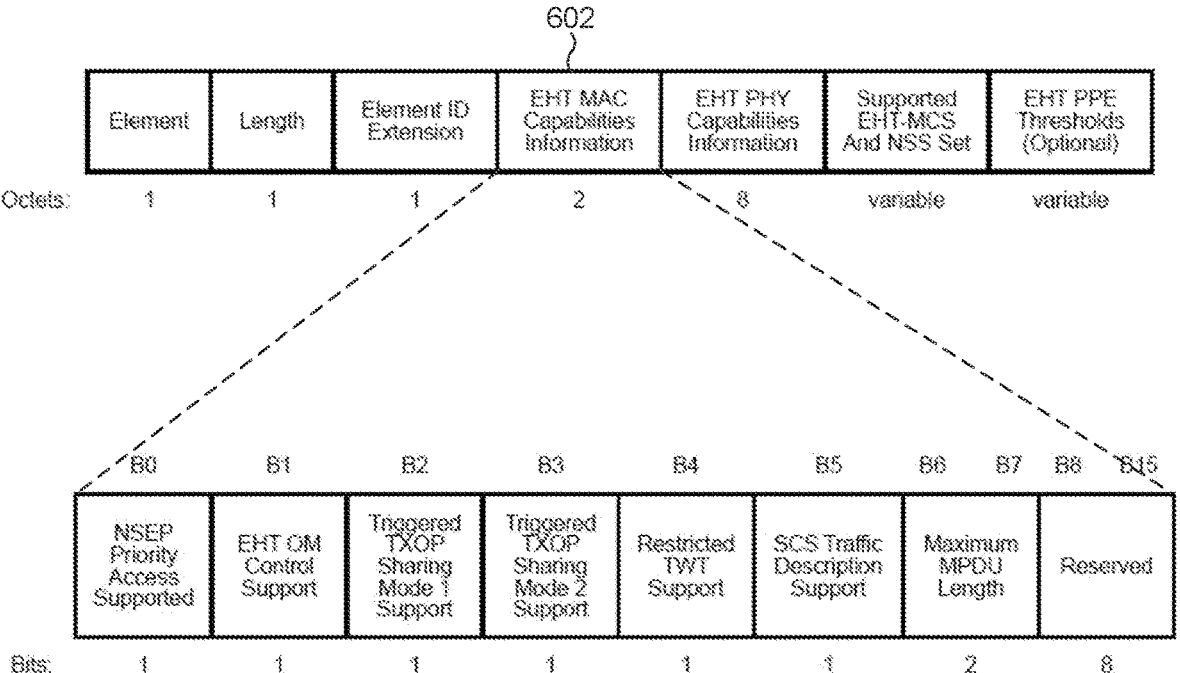
FIG. 6 illustrates an example format of an EHT Capabilities element that can indicate QR mode capability of an MLD according to embodiments of the present disclosure.

FIG. 6 illustrates an example format of an EHT Capabilities element that can indicate QR mode capability of an MLD according to embodiments of the present disclosure. The EHT Capabilities element includes an EHT MAC Capabilities Information field 602, and QR support can be indicated using any of the reserved bits B8-B15 in the EHT MAC Capabilities Information field 602. In one example, B8 can be used to indicate QR mode support. If B8 is set to 0, then QR mode is not supported and if B8 is set to 1, then QR mode is supported.

Figure 7:
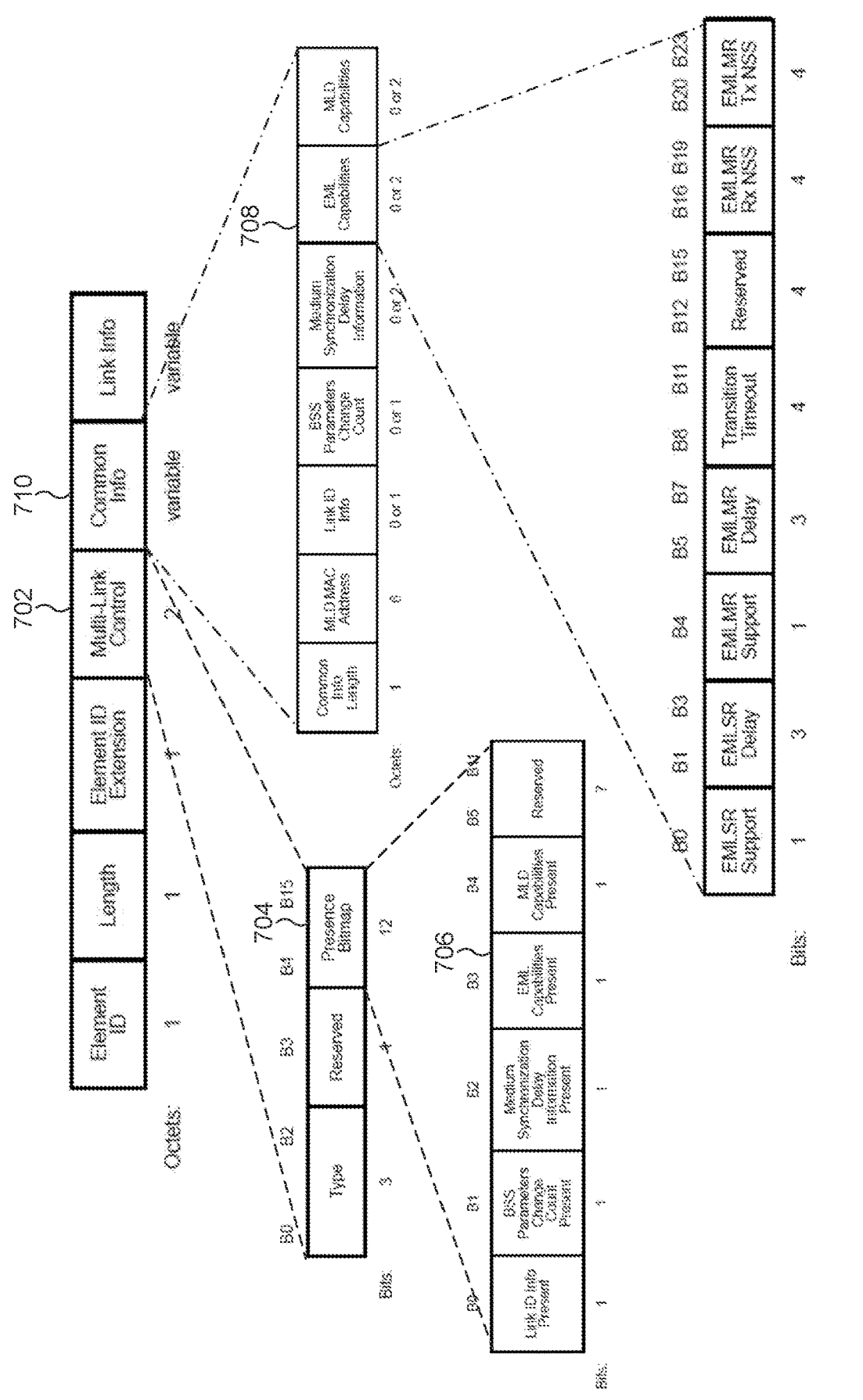
FIG. 7 illustrates an example format of a Basic Multi-Link element that can indicate QR mode capability of an MLD according to embodiments of the present disclosure.

In another embodiment, QR mode capability can be dynamically indicated using a Basic Multi-Link element and including the indication in the Common Info field, as shown in FIG. 7.

FIG. 7 illustrates an example format of a Basic Multi-Link element that can indicate QR mode capability of an MLD according to embodiments of the present disclosure. The Basic Multi-Link element includes a Multi-Link Control field 702, which includes a Presence Bitmap subfield 704, which in turn includes an EML Capabilities Present bit 706. The EML Capabilities Present bit 706 is used to indicate the presence of an EML Capabilities subfield 708 in the Common Info field 710 of the Basic Multi-Link element. Any of the reserved bits B12-B15 in the EML Capabilities subfield 708 can then be used to indicate support for QR mode. In one example, B12 can be used to indicate QR mode support. If B12 is set to 0, then QR mode is not supported and if B12 is set to 1, then QR mode is supported.

Figure 8:
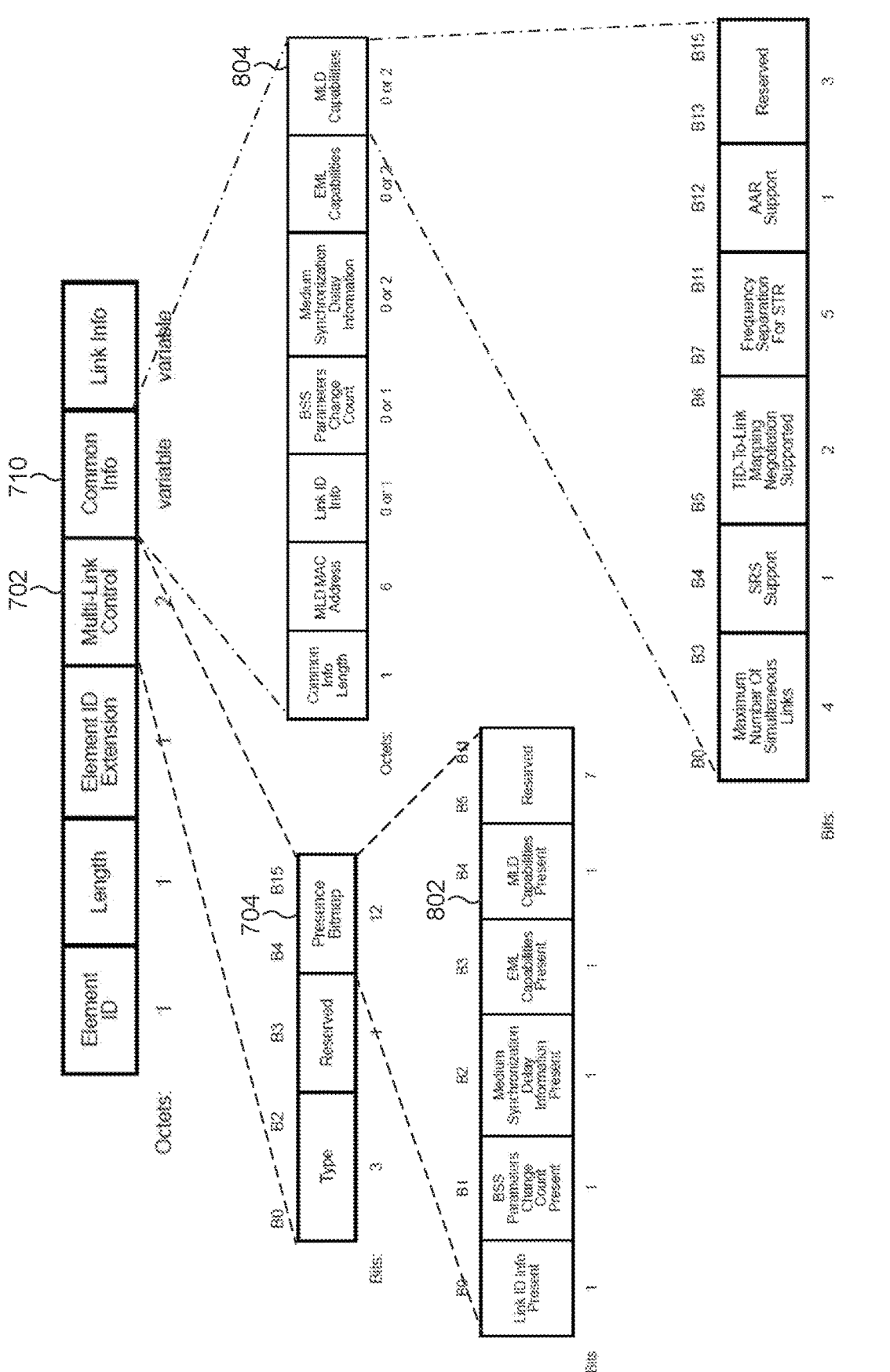
FIG. 8 illustrates another example format of a Basic Multi-Link element that can indicate QR mode capability of an MLD according to embodiments of the present disclosure.

In another embodiment of dynamically indicating QR mode capability using the Common Info field of a Basic Multi-Link element, an MLD capabilities subfield may be used for the indication of QR mode support instead of the EML capabilities subfield, as shown in FIG. 8.

FIG. 8 illustrates another example format of a Basic Multi-Link element that can indicate QR mode capability of an MLD according to embodiments of the present disclosure. Similar to FIG. 7, the Basic Multi-Link element of FIG. 8 includes a Multi-Link Control field 702 which includes a Presence Bitmap subfield 704. In this example, however, an MLD Capabilities Present bit 802 is used to indicate the presence of an MLD Capabilities subfield 804 in the Common Info field 710 of the Basic Multi-Link element. Any of the reserved bits B13-B15 in the MLD Capabilities subfield 804 can then be used to indicate support for QR mode. In one example, B13 can be used to indicate QR mode support. If B13 is set to 0, then QR mode is not supported and if B13 is set to 1, then QR mode is supported.

After indication of QR support, a quick recovery link can be used to transmit a BA during reception of a QoS data A-MPDU on the QoS data link. The BA can carry information that that functions as a retransmission request by indicating failure of some of the decoded MPDUs. For example, the bitmap of the BA (which may include a bit corresponding to each MPDU of the A-MPDU) can be used to request retransmission of MPDUs. This BA may be referred to as a QR-BA. It can be up to the implementation of the receiver to manage retransmission requests from the transmitter.

In one embodiment, after the receiver detects a failed MPDU it can configure the bitmap of the QR-BA to request retransmission setting the bits in the bitmap that precede the bit corresponding to the failed MPDU to 1, setting the bit that corresponds to the failed MPDU to 0, and also setting the rest of the bitmap to 0. In this configuration, the transmitter will retransmit the failed MPDU along with all of the following MPDUs in the A-MPDU on the QR link.

In another embodiment, after the receiver detects a failed MPDU it can configure the bitmap of the QR-BA to request retransmission by setting the bits in the bitmap that precede the bit corresponding to the failed MPDU to 1, setting the bit that corresponds to the failed MPDU to 0, and setting the rest of the bitmap to 1. In this configuration, the transmitter will retransmit only the failed MPDU on the QR link, and will not retransmit the MPDUs that follow the failed MPDU in the A-MPDU.

In another embodiment, the receiver can wait to detect more than one MPDU failure and combine them into one indication of their failure (or request for their retransmission). In this case, the receiver can set the bits in the bitmap that correspond to successfully received MPDUs to 1 and set the bits that correspond to the failed MPDUs to 0. In this configuration, the transmitter will retransmit the indicated failed MPDUs on the QR link. For example, if the receiver wants the transmitter to retransmit the third and fifth MPDUs because they weren't decoded properly, then the BA bitmap may be set to 110101 . . . 1. In such a case, the transmitter will only retransmit the third and the fifth MPDUs.

In a variation of this embodiment, the receiver can set the bits in the bitmap that correspond to successfully received MPDUs to 1, set the bits that correspond to the failed MPDUs to 0, and set the bits that corresponding to MPDUs that follow the most recently detected failed MPDU to either 0 or 1. In this configuration, the transmitter will retransmit the indicated failed MPDUs on the QR link. For example, if the receiver wants the transmitter to retransmit all MPDUs following the fifth MPDU in addition to the failed MPDUs (the third and the fifth MPDU in this example), then the BA bitmap may be set to 110100 . . . 0.

For embodiments of the present disclosure in which a second link is reserved as a QRL ahead of time (e.g., embodiments that do not use opportunistic behavior), the network situation may change making it inconvenient to reserve one link for retransmission while being idle most of the time. In some cases, it is more suitable for the traffic to utilize the two links differently by sending two different A-MPDUs simultaneously on the two links to speed up the transmission and to clear out the transmission buffer. In other words, the cost of reserving one link for quick recovery retransmission may become too high, and outweigh the beneficial effects of the QR mode on the whole network performance.

Due to different traffic requirements and due to the dynamic changes of the traffic, it may not be suitable to only use a QR support indication (which carries the information that the originator and recipient are able to support QR mode) to activate the QR mode. Various embodiments of the present disclosure therefore provide a separate QR activation/termination mechanism to accommodate dynamic traffic changes by dynamically indicating activation or termination of the QR mode, thereby reducing the cost of reserving a QRL.

Embodiments of the QR activation/termination mechanism include a negotiation mechanism between the originator MLD and the recipient MLD, whereby either of the MLDs can request to activate QR mode while waiting for the other side to confirm agreement of QR mode activation. Either of the MLDs (the originator and the recipient) can also request termination of QR mode, and the other side receiving this termination request should comply with this request. By this mechanism QR mode can be activated and terminated dynamically based on network requirements.

In one embodiment, a QR Activation Request (QRAREQ) frame is introduced. The QRAREQ can be transmitted either by the originator or the recipient to indicate a request for activation of the QR mode. The QARREQ can be transmitted at any time when a TXOP is obtained on two links. The other side should respond (e.g., after 1 SIFS) with a QR Activation Response (QRARES) frame to indicate acceptance or rejection of QR mode activation. The QRAREQ and QRARES frames can be sent on any of the enabled links to which the TIDs of the QoS data are mapped.

Figures 9A, 9B, 10:
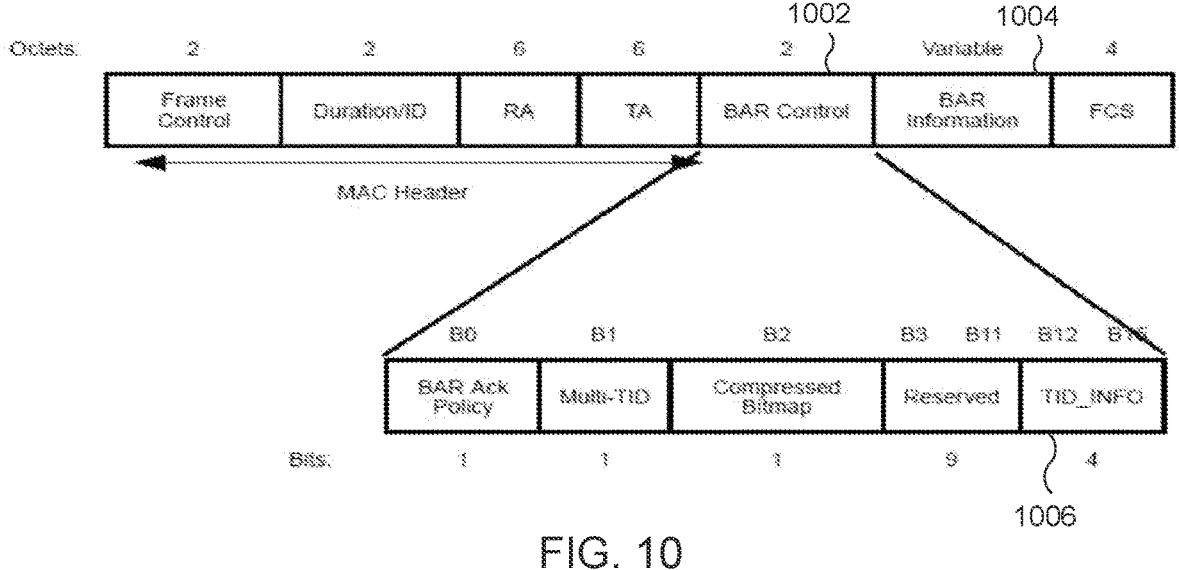
FIGS. 9A and 9B illustrate example formats of a QR Activation Request and QR Activation Response frame according to embodiments of the present disclosure.
FIG. 10 illustrates an example format of a BAR frame according to embodiments of the present disclosure.

FIGS. 9A and 9B illustrate example formats of a QR Activation Request and QR Activation Response frame according to embodiments of the present disclosure. In both of these examples, the same frame format may be used for both the QRAREQ and the QRARES.

In the example of FIG. 9A, the QRL ID field carries the link ID that will be used for quick recovery (i.e., the QRL). The Activation/Termination bit enables the same frame format to be used as a QRAREQ that requests activation and as a QRAREQ that requests termination of the QR mode (set to 1 if activation is requested and set to 0 if termination is requested, or vice versa). Furthermore, the same frame format can be used as a QRARES, in which case the Activation/Termination bit is used to either agree on activation (by responding with the same bit value as the QRAREQ) or reject activation (by responding with the opposite bit value to the QRAREQ).

The example frame format of FIG. 9B may be used when multiple TIDs are mapped to the same link. In that case, QRAREQ and QRARES should carry another field showing which TID/AC is intended for QR mode to enable selecting a subset of the TIDs that are mapped to the same link. In the example of FIG. 9B, the Intended TID/AC field is added to the frame format of FIG. 9A to indicate the subset of the TIDs for which QR mode activation or termination is requested (or responded to).

In another embodiment, the QR support indication can carry information such as the QRL ID and the intended TID/AC. In this case, a transmission that includes a single Activation/Termination bit can be used to dynamically enable or disable QR mode at each TXOP. The Activation/Termination bit can either be transmitted on the link carrying QoS data (either in the beginning of the data transmission or separately before data transmission) or be transmitted on the QRL during data transmission on the other link to utilize the QRL while data is still communicated on the other link.

Figure 11:
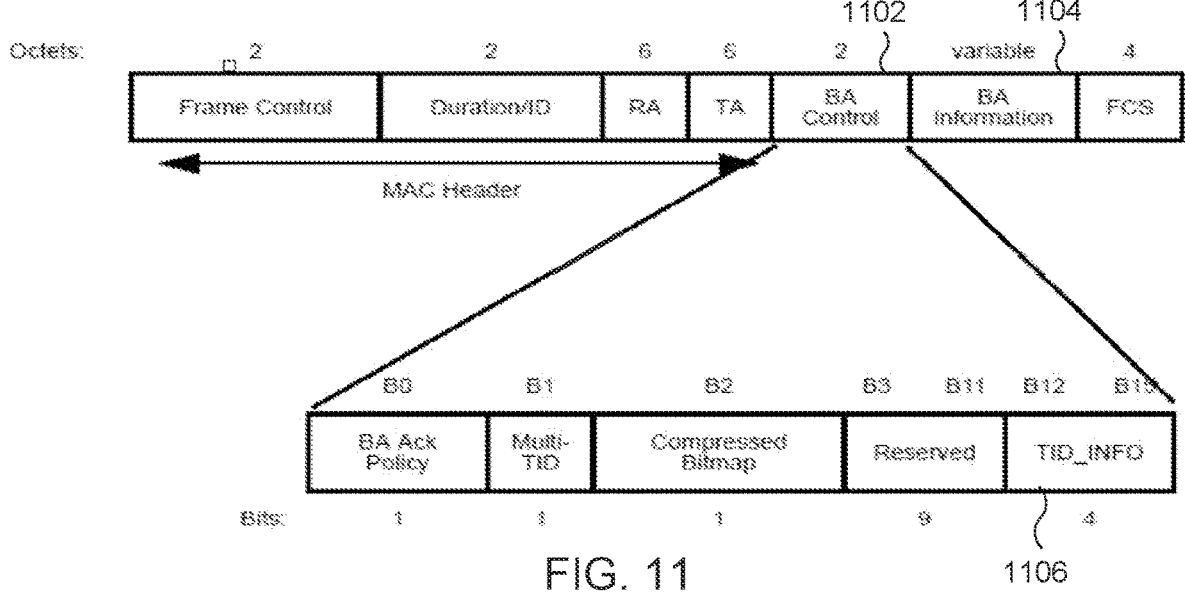
FIG. 11 illustrates an example of a BA frame according to embodiments of the present disclosure.

In another embodiment, the QR mode activation can be performed as part of the BA setup procedure. That is, the QR mode activation information can be included in the BA request (BAR) frame and the BA frame, which have a similar format. FIG. 10 illustrates an example format of a BAR frame according to embodiments of the present disclosure, and FIG. 11 illustrates an example of a BA frame according to embodiments of the present disclosure.

The BAR frame of FIG. 10 includes a BAR control field 1002, which includes reserved bits B3-B11. The BA frame of FIG. 11 includes a BA control field 1102 which includes reserved bits B3-B11, just as the BAR control field 1002 does. Therefore, the QRL ID octet and the Activation/ Termination bit (totaling nine bits) of the QRAREQ and QRARES can be included in both the BAR frame and the BA frame using the nine reserved bits B3-B11.

The BAR frame and the BA frame can also include the Intended TID/AC information of the QRAREQ and QRARES when QR mode is intended to be associated with certain TIDs. For example, the BAR frame of FIG. 10 includes a BAR Information field 1004, which has a variable length set by the TID INFO subfield 1006 of the BAR Control field 1002. Similarly, the BA frame of FIG. 11 includes a BA Information field 1104, which also has a variable length set by the TID_INFO subfield 1106 of the BA Control field 1102.

Figure 12:
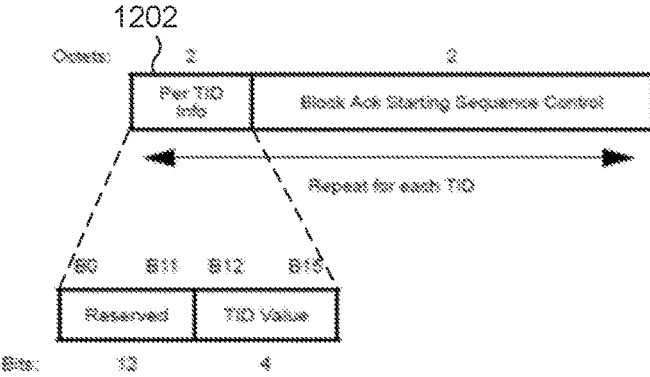
FIG. 12 illustrates an example format of a BAR Information field of a BAR frame or a BA Information field of a BA frame according to embodiments of the present disclosure.

FIG. 12 illustrates an example format of a BAR Information field of a BAR frame or a BA Information field of a BA frame according to embodiments of the present disclosure. That is, the format of the BAR Information field 1004 and the BA Information field 1104 can be the same, and both include a Per TID Info subfield 1202. The Per TID Info subfield 1202 includes 12 reserved bits B0-B11, and the Intended TID/AC octet can be included in both the BAR frame and the BA frame using these reserved bits.

After activating QR mode, BA may (for added reliability) or may not (due to covered information by QR mode) be used. If not used, then expiration timer needs to be added to terminate QR mode.

Figure 13:
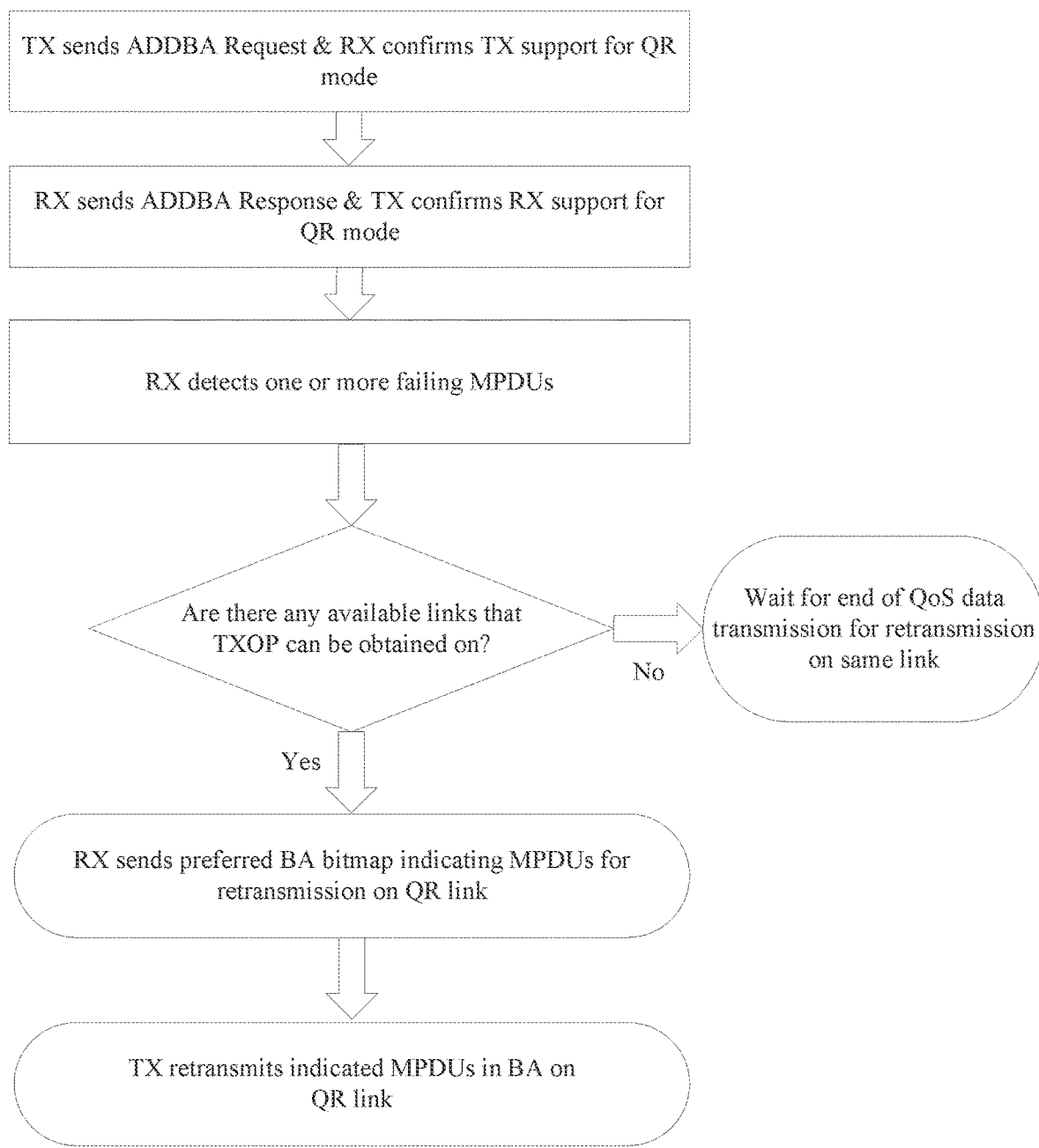
FIG. 13 illustrates an example of an opportunistic quick recovery mode procedure according to embodiments of the present disclosure.

FIG. 13 illustrates an example of an opportunistic quick recovery mode procedure according to embodiments of the present disclosure. In the example of FIG. 9, the indication of QR support may be sent alongside the ADDBA Request and Response frames.

FIG. 14 illustrates an example of a quick recovery mode operation of MLDs that facilitates simultaneous transmission of an A-MPDU and retransmission of failed MPDUs of the A-MPDU according to various embodiments of the present disclosure. The process of FIG. 14 is discussed as being performed by a non-AP MLD, but it is understood that a corresponding AP MLD performs a corresponding process. Similarly, it is understood that the roles of the non-AP MLD and AP MLD can be reversed, and the AP MLD can perform the example process of FIG. 14. For convenience, the process of FIG. 14 is discussed as being performed by a WI-FI non-AP MLD comprising a plurality of STAs that each comprise a transceiver configured to form a link with a corresponding AP affiliated with a WI-FI AP MLD. However, it is understood that any suitable wireless communication device could perform these processes.

Referring to FIG. 14, the process begins with the non-AP MLD generating an information element including an indication that the non-AP MLD is capable of supporting a QR mode (step 1405). Specifically, the information element can indicate that the non-AP MLD is capable of transmitting a request to retransmit MPDUs of an A-MPDU on a second link before reception of the A-MPDU on a first link is complete.

The non-AP MLD then transmits the information element to the AP MLD before reception of any A-MPDU begins (step 1410). This can be done through, for example, the EHT Capabilities element or the Basic Multi-Link element.

In some embodiments, the non-AP MLD may set up BA with the AP MLD such that a BAR frame or a BA frame can include an indication to activate or terminate QR mode (step 1415). This may be done when using non-opportunistic QR behavior, e.g., when the quick recovery mode is activated, the second link is reserved for the transmission of the request to retransmit the at least one MPDU and for a retransmission of the at least one MPDU. In such cases, the non-AP MLD can next generate and transmit a BAR frame or a BA frame to the AP MLD including an indication to activate the QR mode (step 1420).

At step 1425, the non-AP MLD receives, from the AP MLD on a first of the links, an A-MPDU comprised of multiple MPDUs.

The non-AP MLD detects, during reception of the A-MPDU, that at least one of the MPDUs has not been received (step 1430). For example, the at least one MPDU may be received with an error, or may not be received at all.

In some embodiments, after detecting that the at least one MPDU has not been received, the non-AP MLD may determine whether a TXOP can be obtained on any of the links (step 1435). This may be done when using opportunistic QR behavior. In such embodiments, the non-AP MLD may next, based on a determination that the TXOP can be obtained on a second of the links, select the second link for the transmission of the request to retransmit the at least one MPDU on the second link (step 1440).

The non-AP MLD next transmits, to the AP MLD on the second link, a request to retransmit the at least one MPDU on the second link before reception of the A-MPDU on the first link is complete (step 1445). The non-AP MLD may generate a BA frame as the request to retransmit the at least one MPDU, such that the BA frame includes a bitmap that identifies each of the at least one MPDUs to be retransmitted.

The non-AP MLD then receives, from the AP MLD, a retransmission of the at least one MPDU on the second link before reception of the A-MPDU on the first link is complete (step 1450).

Finally, the non-AP MLD transmits, to the AP MLD, an ML-BA for the A-MPDU after reception of all of the multiple MPDUs is complete (step 1455). In non-opportunistic QR behavior embodiments (e.g., when steps 1415-1420 are performed), the ML-BA may include an indication to terminate the QR mode.

The above flowchart illustrates an example method or process that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A non-access point (AP) multi-link device (MLD), comprising:
   stations (STAs), each comprising a transceiver configured to form a link with a corresponding AP of an AP MLD; and
   a processor operably coupled to the STAs,
   wherein a first of the transceivers is further configured to receive, from the AP MLD on a first of the links, an aggregated MAC protocol data unit (A-MPDU) comprised of multiple MPDUs, wherein the processor is configured to detect, during reception of the A-MPDU, that at least one of the MPDUs has not been received, and wherein a second of the transceivers is further configured to transmit, to the AP MLD on a second of the links, a request to retransmit the at least one MPDU on the second link before reception of the A-MPDU on the first link is complete.

2. The non-AP MLD of claim 1, wherein at least one of the transceivers is further configured to:

receive, from the AP MLD, a retransmission of the at least one MPDU on the second link before reception of the A-MPDU on the first link is complete, and transmit, to the AP MLD, a multi-link block-acknowledgement (ML-BA) for the A-MPDU after reception of all of the multiple MPDUs is complete.

3. The non-AP MLD of claim 1, wherein:

the processor is further configured to generate an extremely high throughput (EHT) capabilities element including an indication that the non-AP MLD is capable of transmitting the request to retransmit the at least one MPDU on the second link before reception of the A-MPDU on the first link is complete, and at least one of the transceivers is further configured to transmit the EHT capabilities element to the AP MLD before reception of the A-MPDU begins.

4. The non-AP MLD of claim 1, wherein:

the processor is further configured to set up block acknowledgement (BA) with the AP MLD such that a BA request (BAR) frame or a BA frame can include an indication to activate or terminate a quick recovery mode, and while the quick recovery mode is activated, the second link is reserved for the transmission of the request to retransmit the at least one MPDU and for a retransmission of the at least one MPDU.

5. The non-AP MLD of claim 4, wherein:

the processor is further configured to generate the BAR frame or the BA frame to include:

a quick recovery activation request frame that indicates a request for activation or termination of the quick recovery mode using the second link; or a quick recovery response element that indicates acceptance or denial of a received request for activation or termination of the quick recovery mode using the second link, and at least one of the transceivers is further configured to transmit the BAR frame or the BA frame to the AP MLD.

6. The non-AP MLD of claim 1, wherein:

the processor is further configured to generate a BA frame as the request to retransmit the at least one MPDU, and the BA frame includes a bitmap that identifies each of the at least one MPDUs to be retransmitted.

7. The non-AP MLD of claim 1, wherein the processor is further configured to:

after detecting that the at least one MPDU has not been received, determine whether a transmission opportunity (TXOP) can be obtained on any of the links, and based on a determination that the TXOP can be obtained on the second link, select the second link for the transmission of the request to retransmit the at least one MPDU on the second link.

8. An access point (AP) multi-link device (MLD), comprising:

APs, each comprising a transceiver configured to form a link with a corresponding station (STA) of a non-AP MLD; and a processor operably coupled to the APs, wherein a first of the transceivers is further configured to transmit, to the non-AP MLD on a first of the links, an aggregated MAC protocol data unit (A-MPDU) comprised of multiple MPDUs, wherein a second of the transceivers is further configured to receive, from the non-AP MLD on a second of the links, a request to retransmit at least one of the MPDUs on the second link before reception of the A-MPDU by the non-AP MLD on the first link is complete, and wherein the processor is configured to determine, based on the received request to retransmit the at least one MPDU, that the at least one MPDU was not received by the non-AP MLD.

9. The AP MLD of claim 8, wherein at least one of the transceivers is further configured to:

transmit, to the non-AP MLD, a retransmission of the at least one MPDU on the second link before reception of the A-MPDU by the non-AP MLD on the first link is complete, and receive, from the non-AP MLD, a multi-link block-acknowledgement (ML-BA) for the A-MPDU after reception of all of the multiple MPDUs by the non-AP MLD is complete.

10. The AP MLD of claim 8, wherein:

at least one of the transceivers is further configured to receive, from the non-AP MLD, an extremely high throughput (EHT) capabilities element before transmission of the A-MPDU begins, and the EHT capabilities element includes an indication that the non-AP MLD is capable of transmitting the request to retransmit the at least one MPDU on the second link before reception of the A-MPDU by the non-AP MLD on the first link is complete.

11. The AP MLD of claim 8, wherein:

the processor is further configured to set up block acknowledgement (BA) with the non-AP MLD such that a BA request (BAR) frame or a BA frame can include an indication to activate or terminate a quick recovery mode, and while the quick recovery mode is activated, the second link is reserved for transmission of the request to retransmit the at least one MPDU and for a retransmission of the at least one MPDU.

12. The AP MLD of claim 11, wherein:

at least one of the transceivers is further configured to receive the BAR frame or the BA frame from the non-AP MLD, and the BAR frame or the BA frame includes:

a quick recovery activation request frame that indicates a request for activation or termination of the quick recovery mode using the second link, or a quick recovery response element that indicates acceptance or denial of a received request for activation or termination of the quick recovery mode using the second link.

13. The AP MLD of claim 11, wherein:

the request to retransmit the at least one MPDU is a BA frame that includes a bitmap that identifies each of the at least one MPDUs to be retransmitted, and the processor is further configured to determine each of the at least one MPDUs to be retransmitted based on the bitmap included in the BA frame.

14. The AP MLD of claim 8, wherein:

the second link is selected based on a determination, after detection that the at least one MPDU has not been received by the non-AP MLD, that a transmission opportunity (TXOP) can be obtained on the second link.

15. A method of wireless communication performed by a non-access point (AP) multi-link device (MLD) that comprises stations (STAs) that each comprise a transceiver configured to form a link with a corresponding AP of an AP MLD, the method comprising:

receiving, from the AP MLD on a first of the links, an aggregated MAC protocol data unit (A-MPDU) comprised of multiple MPDUs;

detecting, during reception of the A-MPDU, that at least one of the MPDUs has not been received; and transmitting, to the AP MLD on a second of the links, a request to retransmit the at least one MPDU on the second link before reception of the A-MPDU on the first link is complete.

16. The method of claim 15, further comprising:

receiving, from the AP MLD, a retransmission of the at least one MPDU on the second link before reception of the A-MPDU on the first link is complete; and transmitting, to the AP MLD, a multi-link block-acknowledgement (ML-BA) for the A-MPDU after reception of all of the multiple MPDUs is complete.

17. The method of claim 15, further comprising:

generating an extremely high throughput (EHT) capabilities element including an indication that the non-AP MLD is capable of transmitting the request to retransmit the at least one MPDU on the second link before reception of the A-MPDU on the first link is complete; and transmitting the EHT capabilities element to the AP MLD before reception of the A-MPDU begins.

18. The method of claim 15, further comprising:

setting up block acknowledgement (BA) with the AP MLD such that a BA request (BAR) frame or a BA frame can include an indication to activate or terminate a quick recovery mode, wherein, while the quick recovery mode is activated, the second link is reserved for the transmission of the request to retransmit the at least one MPDU and for a retransmission of the at least one MPDU.

19. The method of claim 15, further comprising:

generating a BA frame as the request to retransmit the at least one MPDU, such that the BA frame includes a bitmap that identifies each of the at least one MPDUs to be retransmitted.

20. The method of claim 15, further comprising:

after detecting that the at least one MPDU has not been received, determining whether a transmission opportunity (TXOP) can be obtained on any of the links, and based on a determination that the TXOP can be obtained on the second link, selecting the second link for the transmission of the request to retransmit the at least one MPDU on the second link.

* * * * *